Oct. 28, 1958     M. BLAIN     2,858,072
RECORD-CONTROLLED ELECTRONIC CALCULATING MACHINE
Filed July 5, 1952     4 Sheets-Sheet 2

INVENTOR
MAX BLAIN
BY Charles E. McTierna
ATTORNEY

Oct. 28, 1958 M. BLAIN 2,858,072
RECORD-CONTROLLED ELECTRONIC CALCULATING MACHINE
Filed July 5, 1952 4 Sheets-Sheet 3
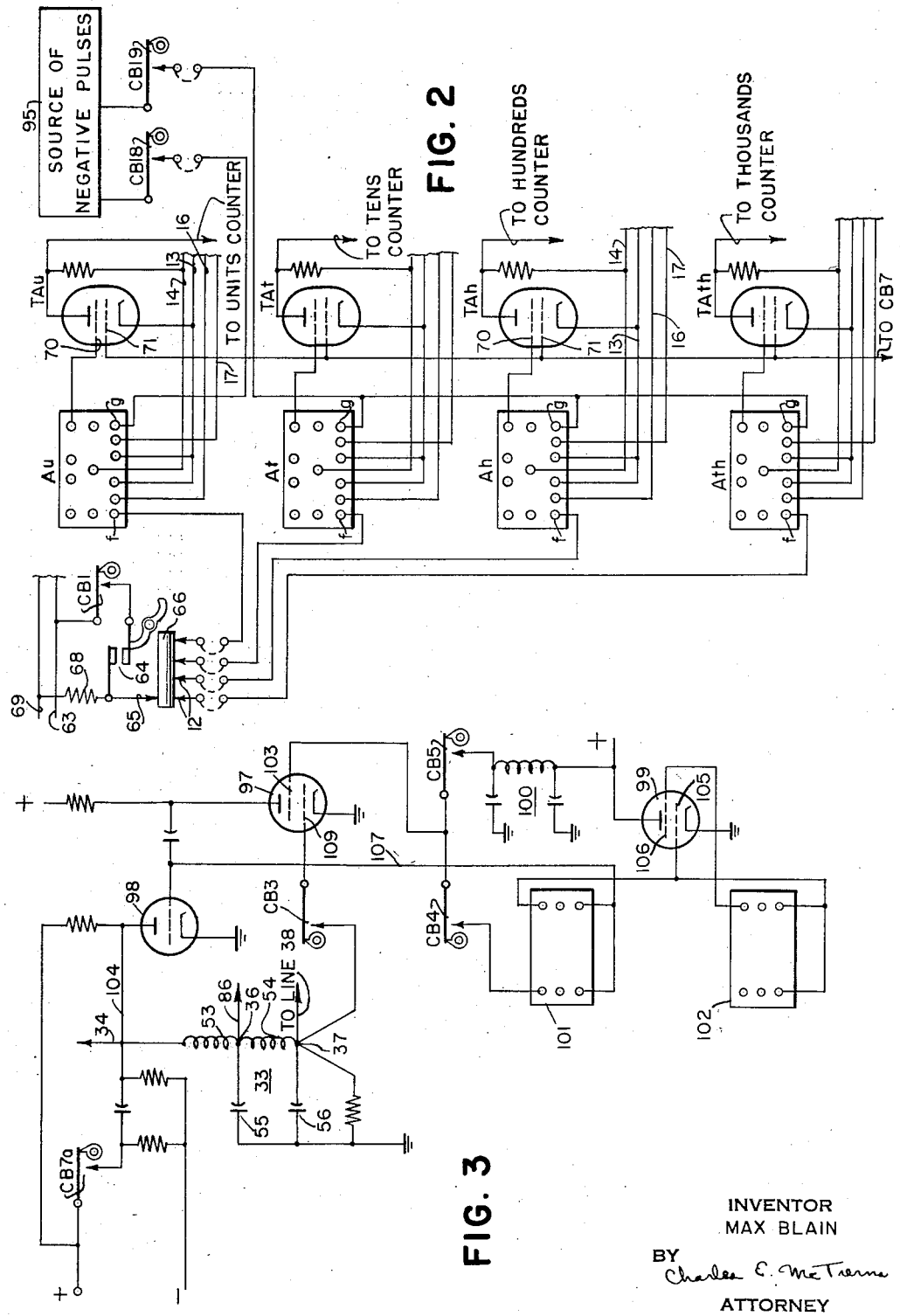
INVENTOR
MAX BLAIN
BY Charles E. McTierna
ATTORNEY Oct. 28, 1958     M. BLAIN     2,858,072
RECORD-CONTROLLED ELECTRONIC CALCULATING MACHINE
Filed July 5, 1952     4 Sheets-Sheet 4

INVENTOR
MAX BLAIN
BY
Charles E. McTiernan
ATTORNEY

United States Patent Office 2,858,072
Patented Oct. 28, 1958

2,858,072
RECORD-CONTROLLED ELECTRONIC CALCULATING MACHINE

Max Blain, Paris, France, assignor to International Business Machines Corporation, New York, N. Y., a corporation of New York Application July 5, 1952, Serial No. 297,329

Claims priority, application France July 13, 1951

16 Claims. (Cl. 235—61.6)

The present invention relates to a record controlled calculating machine and more particularly to a machine for entering a plurality of factors and determining the total thereof within a single card cycle.

In the calculating or computing machines representative of the prior art wherein data are registered simultaneously into counters or into temporary storage devices prior to transferring the data into associated counters from a single record card, the algebraic sum is determined after a number of card cycles involving a number of transferring operations in order to accumulate all the data into a single counter. For example, to determine the sum of two numbers, a registration or read-in cycle and a transfer cycle would be required, while for determining the sum of three numbers, a registration cycle and two transfer cycles would be required.

The principal object of the invention is to provide a calculating device for determining the sum of a plurality of factors within a single card feed cycle.

Another object of the invention is to provide means for computing for each card one or several algebraic sums in the form $A_1 \pm A_2 \pm \ldots A_p$ in a single cycle of the machine while maintaining the speed of the calculating devices representative of the prior art as expressed in the number of cycles per unit of time.

A further object of the invention is to provide a computing device for registering the algebraic summation of a plurality of factors in a single card feed cycle in a single counter without employing storage devices.

A still further object of the invention is to provide means for applying to a single order of a counter discrete pulses representative of numerically equivalent sensed perforations of the corresponding order of a plurality of factors.

A still further object of the invention is to provide means for preventing overlapping application to a single order of a counter of impulses produced by the detection of numerically equivalent perforations of similar corresponding orders of a plurality of factors.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1a and 1b arranged in a vertical sequence constitute the complete circuit diagram of the computing device.

Fig. 2 is a portion of the circuit diagram of Figs. 1a and 1b showing the connections necessary to compute the alegbraic summation of a plurality of positive and negative factors.

Fig. 3 is a circuit diagram which, when coupled to Figs. 1a and 1b enables the sum of factors represented in coded form to be determined.

Figure 1A:
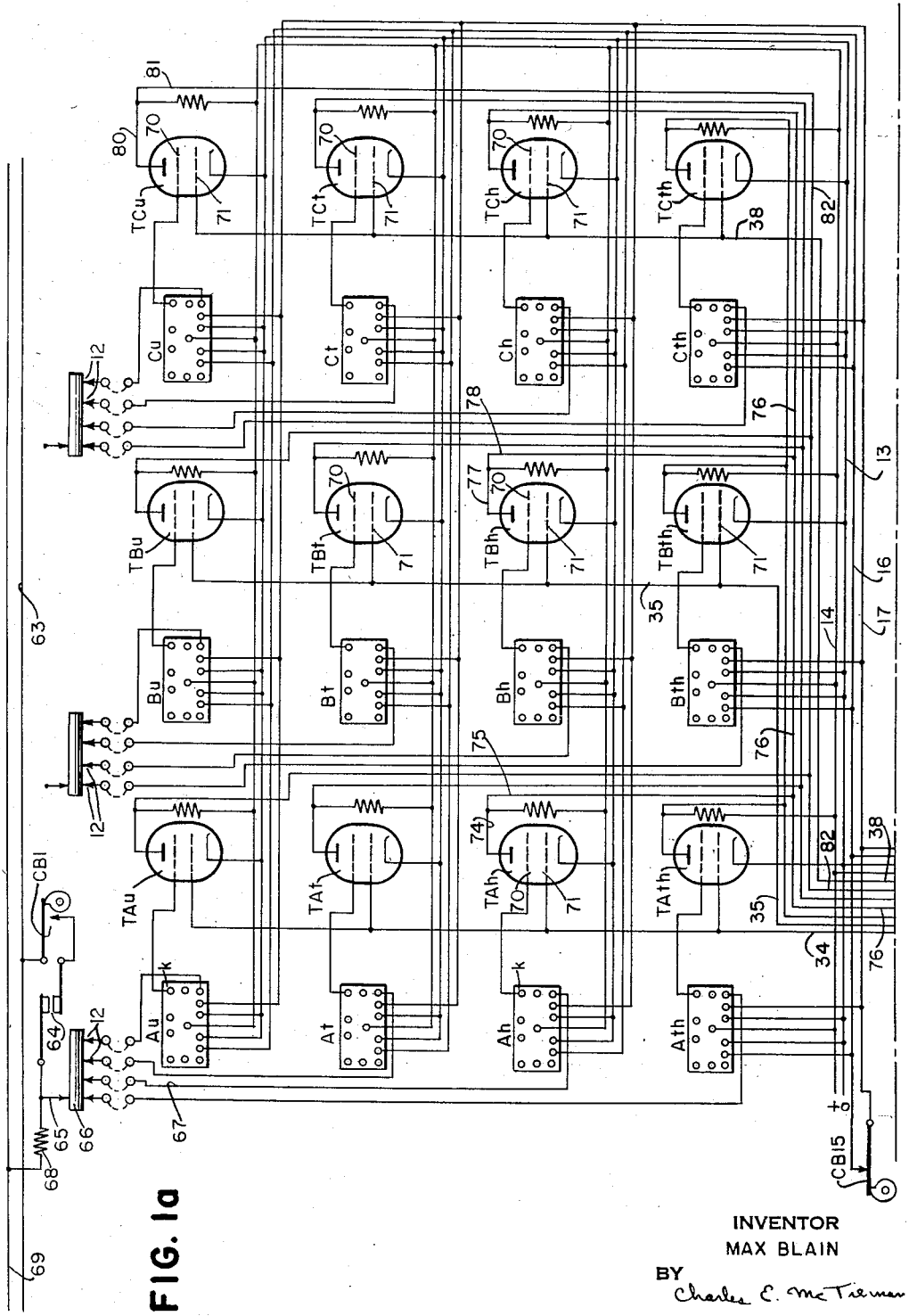

Referring to the drawings, a record card 11 is moved past a row of sensing brushes 12 (Fig. 1a) in a well known manner. The area of the record card 11 (Fig. 5) is subdivided into vertical columns of index point positions. There are eighty columns in a full card and twelve index point positions in each column, one column being used for each digit of a number to be recorded. The index point positions pertaining, respectively, to the ten digits 0, 1 . . . 9 are indicated at the right side of the card in Fig. 5. The two upper index point positions are used for purposes which need not be referred to here. The portion of the card shown is divided into three different vertically disposed fields. In the left-hand, or field A, comprising columns 50 to 52, the number 922 is recorded by perforations. The middle field, or field B, comprising columns 60 to 62, contains the number 932. The right-hand field, or field C, comprising columns 70 to 72, contains the number 939. To obviate a detailed explanation of the well known card feeding mechanism, it will be assumed, for the purpose of the present invention, that the record card 11 is initially brought to a position with the brushes 12 in readiness to traverse the card 11.

The trigger circuit

Before describing the overall operation of the calculating device certain components of the electronic circuit arrangement will be individually described.

The calculating device makes use of a number of trigger circuits. While various trigger circuits are known, I prefer to use one disclosed in U. S. Patent No. 2,536,955 of R. L. Palmer and B. E. Phelps, issued January 2, 1951. The theory of operation of this trigger circuit is fully explained in said application and will only be briefly reviewed here.

Figure 4:
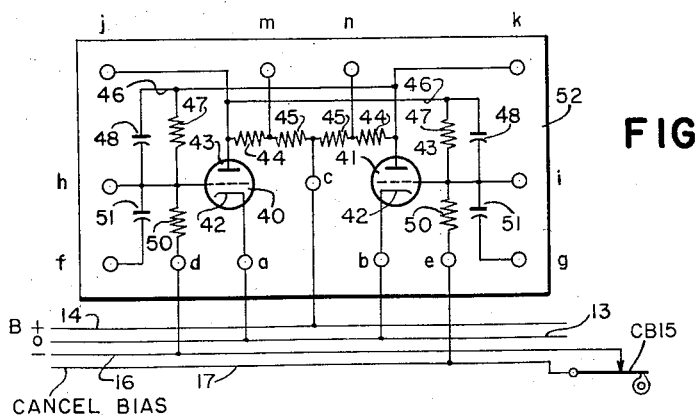
Fig. 4 is a circuit diagram illustrating the details of the trigger circuit.

Fig. 4 shows the trigger circuit. Two tubes 40 and 41 or preferably two halves of a twin tube, such as a 12SN7, have cathodes 42 connected through terminals $a$ and $b$ to a zero potential supply wire 13, and plates 43 connected through load resistors 44, 45 and terminal $c$ to a B+ potential supply wire 14 of approximately +145 volts. The plate 43 of the left-hand tube 40 is coupled through a wire 46 and a resistance 47, shunted by a condenser 48, to the grid of the right-hand tube. The plate of the right-hand tube 41 is similarly coupled to the grid of the left-hand tube 40. The grid of the left-hand tube 40 is connected through a resistance 50 and terminal $d$ to a bias wire 16 which is normally maintained at —92 volts. The grid of the right-hand tube is similarly connected through a resistance 50 and terminal $e$ to a cancel bias wire 17 having the same negative potential as the bias wire. Impulses can be supplied to the grids through impulsing condensers 51 connected to respective terminals $f$ and $g$. Condensers 48 should be larger than condensers 51.

The trigger circuit has two stable states. If the right-hand tube 41 is conducting, which is designated as the normal "off" or switched right condition of an individual trigger, the left-hand tube 40 is non-conducting. As explained in detail later, by means of the cancel bias line 17 the triggers are restored, at a chosen time, to a condition in which the right-hand tube 41 is conducting. Assuming the trigger to be in this switched right state, a negative impulse is applied simultaneously to the terminals $f$ and $g$, of sufficient amplitude to bias off the right-hand tube. As explained in detail in U. S. Patent No. 2,536,955, both halves of the trigger circuit have the same time constant and their condensers will reach 90% discharge at the same time, but because tube 41 which was originally conductive has been cut off by this negative impulse, its plate potential jumps to a high value and causes the grid of tube 40 to rise much more rapidly than that of tube 41 and it rises above the cut-off potential prior to the latter and tube 40 becomes conductive. The plate potential of tube 40 drops and the potential on the grid of tube 41 ceases to rise, being actually depressed considerably below the point at which the tube would be conductive. The trigger circuit will remain in this second stable state, which may be referred to as the "on" state or condition, until another negative impulse is received, when the process will be reversed and the right-hand tube 41 made conductive while the left-hand tube 40 is cut off. It is to be particularly noted at this time and as pointed out in detail in said U. S. Patent No. 2,536,955, the trigger circuit does not respond to positive impulses applied through the impulsing condensers 51, of the same amplitude as the negative impulses used. For this reason, as a source of impulses, the impulsing condensers can be connected to a point, such as the plate of a tube, at which the potential alternately rises and falls, and the trigger will be switched by the falling potential but not by the rising potential.

Figure 6:
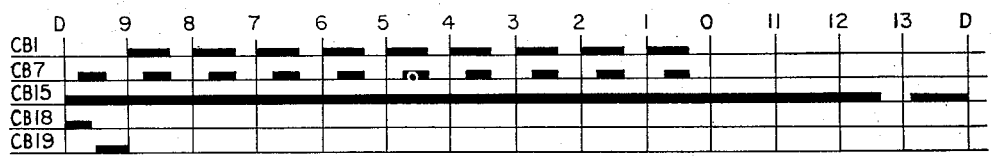
Fig. 6 is a timing diagram showing one complete card cycle when record cards similar to that shown in Fig. 5 are being fed and sensed in a well known manner.

To restore the trigger circuit of Fig. 4 to its normal state, in which the right-hand tube 41 is conducting, the negative potential of —92 volts is momentarily removed from the cancel bias wire 17 conductively connected to the grid of tube 41 through terminal e when the cam controlled contacts CB15 break as shown in the timing diagram of Fig. 6, allowing the potential in the right-hand grid to rise to a point which renders the right-hand tube 41 conductive to switch the trigger to the right and cuts off the left-hand tube. It is also possible to switch the trigger by means of positive potentials applied directly to terminals h or i which are connected conductively to the respective grids. This method of restoring the triggers to a chosen initial switched right or switched left condition is employed to produce the chosen initial state desired for any particular trigger as pointed out later.

Potentials can be tapped off the trigger circuit through terminals j, k, m and n, which are connected as shown to the plates or to points between the two parts 44 and 45 of the load resistors. The entire trigger circuit diagram is enclosed in a rectangle 52 within which the terminals have certain positions. In the other circuit diagram the trigger circuits are represented simply by rectangles having terminals therein as shown in Fig. 4.

*Electronic counter*

The electronic counter circuit comprises a series of trigger circuits or stages each similar to the trigger circuit of Fig. 4 as just described, and interconnected in a manner such as disclosed in U. S. Patent No. 2,536,955, issued January 2, 1951. The electronic counter is illustrated in Fig. 1b only sufficiently to enable the general operation of the calculating device to be understood, and reference should be made to the above-mentioned patent for a more complete description.

Figure 1B:
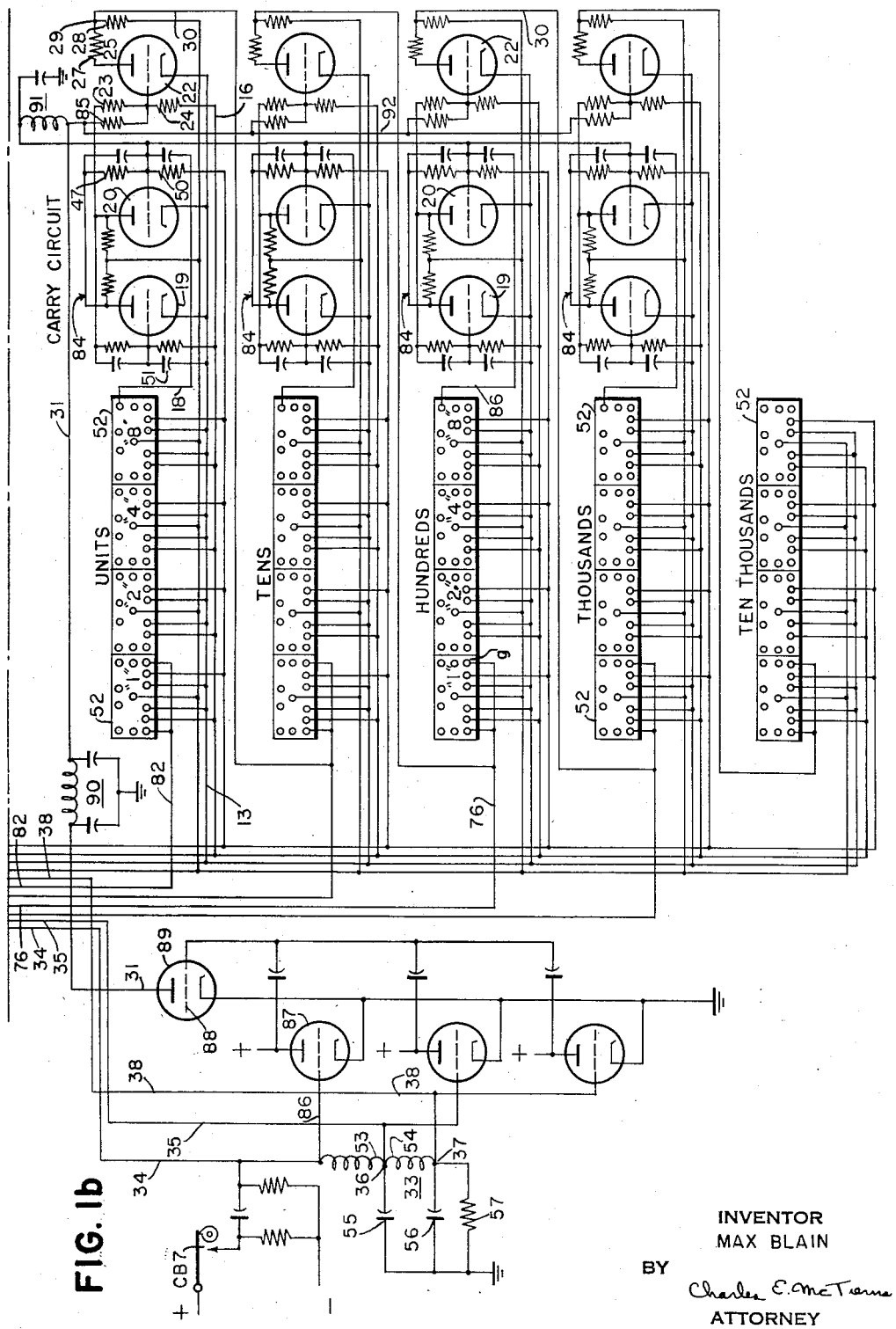

The electronic counter is shown in Fig. 1b to consist of five orders respectively representative of units, tens, hundreds, thousands and ten thousands order and so labeled where each order comprises four trigger stages which are numbered 1, 2, 4 and 8 according to the binary notation system. The number assigned to each of the stages represents the number of pulses necessary to shift on the particular stage.

In the actual operation of the counter, the four trigger circuits of each order are considered to be off when in a zeroized status. At the zeroized status of the trigger circuits, the right-hand device of each trigger is conducting while the left-hand device of each trigger is non-conducting. The trigger circuits of the counter are considered to be on when the left-hand device is conducting.

When a negative pulse is concurrently applied to the terminals f and g of the trigger "1" of the units order, there will be only a single shift thereof since the pulse will have no direct effect upon the non-conducting device. This first negative pulse will render the left-hand device conducting and the right-hand device non-conducting. When the right-hand device of the "1" trigger is made non-conductive, a positive pulse is applied to the "2" trigger which, due to the parameters thereof, does not respond to positive pulses.

With the application of a second negative pulse to the "1" trigger, the "1" trigger is switched back to the right-hand tube conducting and the "2" trigger is switched to the left-hand tube conducting due to the negative pulse applied thereto from the "1" trigger.

The third and fourth negative impulses applied to f and g terminals of the "1" trigger cause a further on and off shift of this trigger. As the "1" trigger shifts off upon the fourth negative pulse being applied thereto, the "2" trigger is tripped off or switched back to the right-hand tube conducting which is accompanied by the "4" trigger being tripped on.

The fifth and sixth negative impulses applied to the f and g terminals cause a double shift of "1" trigger back to the right-hand tube conducting and a single shift to on status of trigger "2" with the "4" trigger retaining its on status. The seventh and eighth negative impulses again cause the "1" trigger to shift twice and the "2" and "4" triggers to shift off. On the eighth negative pulse the "8" trigger shifts to an on position. The ninth negative pulse places the "1" trigger in an on position while the "8" trigger is unaffected thereby and thus retains its on status. The tenth negative impulse will restore the trigger circuits to a zeroized condition as well as conditioning the carry circuit for an entry of a unit into the next higher order as shall be presently described. For a more complete description of the functioning of the counter, reference should be made to Patent No. 2,536,955.

*The carry circuit*

The output terminal k of the "8" trigger of the units order (Fig. 1b) of the counter, for example, is coupled through the conductor 18 to the right half of a carry trigger circuit 84, substantially like the counter trigger circuits of Fig. 4. The grid of the tube 19 is coupled through a capacitor 51 to 0 volt line 13. The lower end of the grid voltage divider 47 and 50 of the tube 20 is connected to another —92 volt cancel bus 21. The tube 20 will be normally conductive. When the units order shifts from a 9 indication to a 0 indication, a negative carry impulse will be applied from the output terminal k of the "8" trigger to the grid of the tube 20 causing the carry trigger circuit 84 to shift to the left. Associated with the carry trigger circuit 84 is the triode 22, the grid 25 of which is connected to an intermediate point of a voltage divider composed of two resistors 23 and 24 connected between the plate of the tube 20 and the —92 volt wire 16. The plate of the tube 22 is connected through a voltage divider 27 and 28 to the line 14 coupled to the positive terminal of a source of potential not shown. A carry transfer terminal 29 at the mid-point of the voltage divider 27 and 28 is connected by a lead 30 to the input terminals f and g of the tens order of the counter. The potential on the grid 25 of tube 22 is considerably below cut-off when the tube 20 is conducting. When the trigger 84 transfers to the left, the plate potential of the tube 20 rises and lifts the potential of the grid of the tube 22 to just below the point at which the tube becomes conductive. The carry circuit remains in this condition, after receiving a carry impulse through its counter output lead 18 until the carry operate time.

The counters and carry circuits of all the five orders are identical and the carry transfer terminal 29 of each of the first four orders is connected by a lead 30 to the input terminals *f* and *g* of the next higher order.

As shall be made clearer subsequently, a positive pulse will be applied during carry operate time over conductor 31 and resistor 85 to the grid 25 of the tube 22 to render this tube conductive. Upon being made conductive, the tube 22 will cause a negative pulse to be applied over the conductor 30 to the "1" trigger of the next higher order thereby adding one in that order.

Operation

Figure 5:
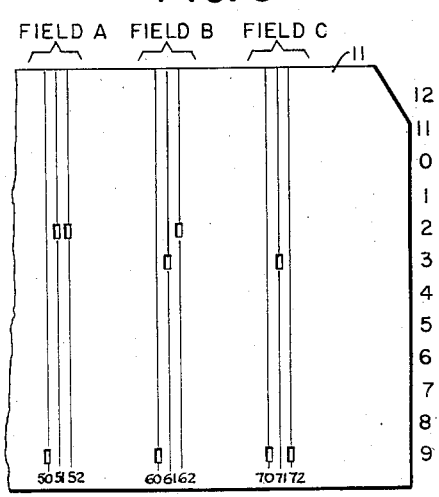
Fig. 5 is a face view of a portion of a perforated card.

The operation of the machine will now be explained with reference to the reading of the three factors 922, 932 and 939 contained in the respective fields A, B and C of the record card 11 of Fig. 5 and the registering of the arithmetical summation thereof in the electronic counter all within the same cycle of operation.

As alluded to previously, it will be assumed for the purposes of the present invention that the record card is initially brought to a position where the brushes 12 are in readiness to traverse the card 11. A more detailed explanation of the mechanism necessary to carry out this card feeding and analyzing operation may be found in U. S. Patent No. 2,396,229, issued March 12, 1946, to R. T. Blakely.

As shown in Fig. 1a, the brushes 12 which are to scan or sense the various orders of the fields A, B and C are plugged to the corresponding trigger circuits. For example, the brush 12 which will sense the units order of field A is plugged to right side of trigger A$u$; the brush 12 which will sense the tens order of field A is plugged to the right side of trigger A$t$; the brush which will sense the hundreds order of field A is plugged to the right side of trigger A$h$; and the brush which will sense the thousands order of field A is plugged to the right side of trigger A$th$. The brushes for sensing the remaining fields B and C are similarly plugged.

Now when row 9 of the record card 11 is traversed by the sensing brushes 12, the four 9 holes in the three factors as represented in fields A, B and C will be detected causing a negative pulse to be applied to the appropriate trigger circuit. As an example, the circuit established upon sensing the 9 perforation in the hundreds order of field A for applying a negative pulse to the right side of the trigger A$h$ is traceable as follows: conductor 63 connected to the positive terminal of a source of potential of 105 volts, cam controlled contacts CB1 now closed (which contacts close during each digit representing index point of the machine as shown in the timing diagram of Fig. 6), the usual card lever contacts 64 closed in a well known manner, common brush 65, contact roll 66, brush 12 sensing the hundreds order of field A, conductor 67 to the right side of the trigger A$h$. It is to be noted that the cam controlled contacts CB1 extend the reduced potential of conductor 63 in negative pulses through the card lever contacts 64 to the common brush 65, which is also connected through the resistor 68 to the higher voltage of line 69 which is connected to the positive terminal of a source of potential of 145 volts, and the contact roll 66.

This negative pulse applied to the trigger A$h$ will render the left-hand tube conductive and the right-hand tube non-conductive in a manner as previously described, it being recalled that the normal position for the trigger A$h$ is that of the right-hand tube being conducting while the left-hand tube is non-conducting. In a similar manner, the trigger circuits B$h$, C$u$ and C$h$ will be shifted with the respective sensing of the 9 perforation in the hundreds order of B field, and the units and hundreds order of C field.

With the right-hand side of the trigger A$h$ now rendered non-conductive, the potential of the associated terminal $k$ will rise causing a corresponding increase of potential on the grid 70 of the corresponding normally non-conductive tube TA$h$. Similarly the potentials on the grid 70 of the tubes TB$h$, TC$u$ and TC$h$ respectively associated with the triggers B$h$, C$u$ and C$h$ will rise. In each case the tubes TA$h$, TB$h$, TC$u$ and TC$h$ remain non-conductive until the corresponding first control grid 71 receives a positive pulse in a manner to be presently described.

The application of a positive potential to the control grid 70 will partially condition or prime the associated tube for the entering of a count into the appropriate order of the counter upon said tube receiving a positive pulse applied to the control grid 71 in a manner to be now described. It is to be understood that when the positive potential is applied to the grid 71 due to the sensing of a designation, such an operation is similar to the storing of the sensed designation.

Each of the tubes TA$u$, TA$t$, TA$h$, TA$th$, TB$u$, TB$t$, TB$th$, TC$u$, TC$t$, TC$h$ and TC$th$ (Fig. 1a) have their first control grid 71 commonly connected to a source of positive pulses as represented by the cam controlled contacts CB7 (Fig. 1b) which makes for each index point position as shown in the timing diagram of Fig. 6. The first control grid 71 of the normally non-conductive tetrodes TA$u$, TA$t$, TA$h$ and TA$th$ are directly coupled through the conductor 34 to cam controlled contacts CB7, while the first control grid 71 of the tetrodes TB$u$, TB$t$, TB$h$ and TB$th$ are coupled to the contacts CB7 through conductor 35 to the terminal 36 of the segmented delay line 33, and the first control grid 71 of the tubes TC$u$, TC$t$, TC$h$ and TC$th$ are coupled to the contacts CB7 through conductor 38 to the terminal 37 of the delay line 33. The connections to the terminals 36 and 37 are so selected so as to progressively delay in equal increments the application of the positive pulse supplied by the making of the cam controlled contacts CB7 to the associated tetrodes. That is, the positive pulse produced by the making of the contacts CB7 will be applied without any delay to the first control grid of the tubes TA$u$, TA$t$, TA$h$ and TA$th$, then with a slight delay to the first control grid of the tubes TB$u$, TB$t$, TB$h$ and TB$th$, and then with an additional time delay to the first control grid of the tubes TC$u$, TC$t$, TC$h$ and TC$th$.

The segmented delay line 33 (Fig. 1b) is one which is well known and is shown as consisting of a plurality of inductors 53 and 54 serially coupled with the capacitor 55 coupled between the terminal 36 of the inductor 53 and ground, and the capacitor 56 coupled between the terminal 37 of the inductor 54 and ground. A terminating impedance 57 is coupled in parallel with the capacitor 56 for the purpose of minimizing reflections. An example of the delay line which may be employed in the present invention is shown in U. S. Patent No. 2,266,401, issued December 16, 1941, to A. Reeves.

Now when the contacts CB7 close at approximately 9.2 index time, a positive pulse will be applied directly over conductor 34 to the first control grid 71 of the tubes TA$u$, TA$t$, TA$h$ and TA$th$; through terminal 36 of the delay line 33 and over conductor 35 to the first control grid 71 of the tubes TB$u$, TB$t$, TB$h$ and TB$th$; and through terminal 37 of the delay line 33 over conductor 38 to the first control grid 71 of the tubes TC$u$, TC$t$, TC$h$ and TC$th$.

The application of the CB7 impulse to the grid 71 will completely condition the associated tubes in a prime condition for the entering of a count into the appropriate order of the order as shall be presently described.

The application of the positive pulse to the grid 71 of the tube TA$h$, for example, renders this tube conductive inasmuch as the second control grid 70 thereof has applied thereto an increased potential as previously described. The energization of TA$h$ will cause a negative pulse to be applied over conductors 58 to the "1" trigger of the hundreds order counter thereby registering a count of 1 in said counter. This circuit is traceable from the anode of the tube TA$h$ (Fig. 1a) as follows: conductors 74 and 75, conductor 76 (Figs. 1a and 1b), and then to terminal g of the "1" trigger of the hundreds order of the counter.

After a first incremental time delay introduced by the delay line 33, the tube TBh will be made conductive and in a similar manner apply a negative pulse over conductors 77, 78 and 76 (Figs. 1a to 1b) to the hundreds order counter to cause said counter to register the count of 2.

After a second incremental time delay, the tube TCh will be made conductive and in a similar manner apply a negative pulse to the hundreds order counter to cause said counter to register the count 3. Simultaneous with the rendering of the tube TCh conductive, the tube TCu will be made conductive and as a result cause a unit to be entered in the units order counter. The circuit established for entering the count of 1 in the "1" trigger of the units counter is traceable from the anode of tube TCu (Fig. 1a) as follows: conductors 80 and 81, line 82 (Figs. 1a to 1b), to the terminal g of the "1" trigger of the units order.

Thus upon sensing the four 9 perforations in fields A, B and C, there will be entered in the hundreds order counter a count of 3 and in the units order counter a count of 1.

When the cam controlled contacts CB7 break at 9.7 index time, the tubes TAh, TBh, TCu and TCh will all be restored to a non-conductive condition, but the increased potential on the grid 70 thereof will still exist inasmuch as the associated trigger circuit is in a shifted condition.

At 8.2 index time the cam controlled contacts CB7 will make as shown in the timing diagram of Fig. 6 to render the tubes TAh, TBh, TCu and TCh conductive once again, thereby enabling an additional count of 3 and a count of 1 to be respectively registered in the hundreds and units order counters in a manner as previously described. The units and hundreds order counter will at this time have registered therein the total count of 2 and 6, respectively.

While row 7 of the record card is being traversed by the brushes 12, three further units will be entered in the hundreds order counter while an additional unit will be entered in the units order counter. These additional units entered in the units and hundreds order counters will bring the total registered therein to 3 and 9, respectively.

When the cam controlled contacts CB7 close at approximately 6.2 index time, a positive pulse will be applied over conductor 34 (Fig. 1b) to the control grid of the tube TAh causing the tube to become conductive, in a manner as previously described, and as a result register an additional unit in the hundreds counter. This additional unit entered in the hundreds counter will cause this counter to shift from a 9 to a 0 count thereby causing a negative pulse to be applied from terminal k of the "8" trigger over conductor 86 to the right side of the associated carry trigger circuit 84. This negative pulse will shift the carry trigger 84 of the hundreds order which as a result, and as previously described, will bring the carry tube 22 up to just below a point where the tube 22 becomes conductive.

At the same time the CB7 positive pulse is applied over conductor 34 it will be applied over conductor 86 (Fig. 1b) to the control grid of the normally non-conductive tube 87, rendering the same conductive. When the triode 87 becomes conductive it applies a negative pulse to the control grid 88 of the normally conductive tube 89, rendering this tube non-conductive. The tube 89 will then apply a positive pulse over the conductor 31, through the delay network 90 and over a conductor 92 to the control grid 25 of the carry tube 22 of the hundreds order, rendering this tube 22 conductive. As previously mentioned, when the tube 22 is made conductive a carry pulse is applied to the next higher order over the conductor 30 to register a count of 1 therein.

The positive pulse supplied when the tube 89 is made non-conductive will also be fed through the delay network 91 (Fig. 1b) to the control grid of the tube 20 of the carry trigger circuit 84. This pulse will restore the carry trigger circuits to the normal condition thereof after the carry pulse has been applied to the next higher order.

It is to be noted that each time the contacts CB7 make a resulting positive pulse from tube 89 will be applied to the carry tube 22 and the carry trigger circuit 84, but such will be ineffective in bringing about a carry operation unless accompanied by a negative pulse being applied from the "8" trigger to the associated carry trigger circuit.

During the 6 index time the two delayed positive pulses as obtained from terminals 36 and 37 of the delay line 33 in addition to the positive pulse directly applied, will be applied as previously described.

When the cam controlled contacts CB7 break at 6.7 index time as shown in the timing diagram of Fig. 6, the units counter will have entered therein a count of 4, the hundreds counter will have registered therein a count of 2, while the thousands counter will have registered therein a count of 1.

Similarly when the cam controlled contacts CB7 make at 5.2 and 4.2 index time, a count of 3 in the form of three separate pulses will be entered each time in the hundreds order counter and a count of 1 will be entered each time in the units order counter. Thus when the contacts CB7 break at 4.7 index time, the units order counter will have registered therein a total count of 6, the hundreds order counter a count of 8, and the thousands order counter will have registered a count of 1.

When the brushes 12 sense the 3 index position, a 3 perforation in the tens order of fields B and C will be detected. The detection of the 3 perforation in these fields will result in a negative impulse being applied to the trigger circuits BT and CT (Fig. 1a) causing these circuits to be shifted. As previously described, the shifting of these triggers will increase the potential of the grid 70 of the associated tubes TBt and TCt such that these tubes will be rendered conductive when the delayed positive pulses are applied to the grid 71 of each of the tubes. Upon becoming energized the tubes TBt and TCt will each enter a count of 1 in the tens order counter such that this counter will register a total count of 2.

Likewise during the 3 index time, three additional units will be entered in the hundreds order counter which will cause this counter to pass from 9 to 0 thereby initiating a carry operation. Also, an additional count will be entered in the units counter. When the contacts CB7 break at 3.7 index time, the units counter will have a count of 7 entered therein, the tens counter will have a count of 2 entered therein, the hundreds counter will have a count of 1 entered therein, and the thousands counter will have as a result of two carry operations a count of 2 entered therein.

When the brushes 12 sense the 2 index position, the 2 perforations in the units and tens order of field A and the units order of field B will be detected. The resultant operations carried out upon detection of these perforations have been suitably described previously and will not be repeated. Suffice it to say that when the contacts CB7 make at 2.7 index time, an additional count of 3 will be entered in each of the units, tens and hundreds counters and that the units order will pass from 9 to 0 causing an additional count of 1 to be entered in the tens counter. Thus when the contacts CB7 break at approximately 2.7 index time, the units counter will be registering a count of 0, the tens counter a count of 6, the hundreds counter a count of 4, and the thousands counter a count of 2.

When the contacts CB7 make at 1.2 index time, further impulses in a manner as described will be entered into the pertinent counters. Thus when the contacts CB7 break at 1.7 index time, the sum of three factors will be standing in the counters such that the units counter will have registered therein a count of 3, the tens counter a count of 9, the hundreds counter a count of 7, and the thousands counter a count of 2.

While means are not provided for reading out the total entered in the various orders of the counter, it is obvious that such could be provided.

As shown in the timing diagram (Fig. 6), the cam controlled contacts CB15 (Fig. 1a) break at approximately 12.7 index time to restore all trigger circuits to the normal operating condition thereof. When the contacts CB15 break, the bias potential of —92 volts of conductor 16 is no longer extended to conductor 17. It is to be noted that the control grid of the right-hand tube of each trigger is normally coupled to conductor 17, and that when the bias potential is removed the right-hand tube is made conductive. While the trigger circuits constituting the electronic counter are shown as being under the control of the contacts CB15, it is to be noted that such is mainly for the convenience of describing the applicant's invention. It is obvious that independent reset means could be provided for the electronic counter, and that such would be necessary in registering the total of a plurality of factors in many record cards.

The computing of the algebraic sum of a number of positive and negative factors may also be determined with a slight modification of the applicant's circuitry for the entering of a negative factor into the electronic counter.

In Fig. 2, the necessary connections and additional elements for the entering of a negative factor are shown. The brushes 12 sensing the respective orders of the negative factor are now coupled to the $f$ terminal of the corresponding trigger circuits $Au$, $At$, $Ah$ and $Ath$, it being assumed that the negative factor is represented in field A. It should be remembered that for a positive factor the brushes 12 are coupled to the terminal $g$ of the corresponding trigger circuits.

The terminal $g$ of the trigger $Au$ is now coupled through the cam controlled contacts CB18 to a source of negative pulses 95 while the terminals $g$ of the triggers $At$, $Ah$ and $Ath$ are each coupled through the cam controlled contacts CB19 to the source of negative pulses 95.

Now before row 9 of the record card is sensed by the brushes 12 and at D index time, the cam controlled contacts CB18 will make as shown in the timing diagram of Fig. 6, causing a negative pulse to be applied to the trigger $Au$. As previously described, the negative pulse applied to the right-hand tube of the trigger circuit will shift the trigger to the left and, as a result, apply an increase in potential to the grid 70.

Now when contacts CB7 make at D.2 index time before row 9 of the record card is sensed by the brushes 12, such as shown in the timing diagram of Fig. 6, a positive pulse will be applied to the grid 71 of the tube $TAu$ causing this tube to become conductive, and resulting in the entering of a count of 1 in the units order counter.

When contacts CB19 make at D.5 index time before row 9 is sensed, it will cause a negative pulse to be applied to the trigger circuits $At$, $Ah$ and $Ath$, resulting in these circuits being shifted and the potential of the grid 70 of the associated tube $TAt$, $TAh$ and $TAth$ being increased.

Thus it is now apparent that each of the tubes $TAu$, $TAt$, $TAh$ and $TAth$ are now in a condition to apply a count of 1 into the respective counters for each subsequent making of the contacts CB7 until a perforation is detected in the corresponding order. When a perforation is detected in particular order as the card is being sensed, a negative pulse will be applied to terminal $f$ of the pertinent trigger circuit, trigger circuit $At$ for example, causing this trigger to be shifted back to the right. With the right-hand side of $At$ now conducting, the potential of grid 70 of tube $TAu$ will be decreased. With the grid 70 of the tube $TAu$ now in this decreased potential condition, the tube $TAu$ will no longer be susceptible to CB7 pulses, that is, subsequent CB7 pulses applied to the grid 71 of the tube $TAu$ will not render the tube $TAu$ conductive inasmuch as the grid 70 is at a decreased potential.

Thus it is obvious that the values representing the negative factor are registered in the counter pursuant to the nines complement except for the units value which is registered according to the tens complement.

The remaining operations are similar to that described for computing the arithmetical summation and will not be repeated.

Figure 7:
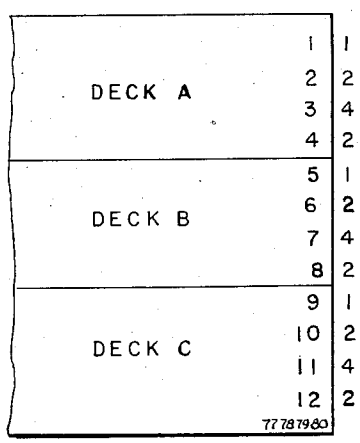
Fig. 7 is a face view of a portion of a three-deck perforated card.

With the addition of the circuitry of Fig. 3 to that of Figs. 1a and 1b, and the changing of the timing of the cam controlled contacts CB7 and CB15 to that shown for contacts CB7a and CB15a, respectively (Fig. 7), the applicant's invention lends itself to computing the totals of a plurality of factors entered in a multideck card such as shown in Fig. 7. The record card of Fig. 7 is the same in outline as that of Fig. 5 in that a plurality of data receiving columns are provided, in each of which data may be represented by perforations. In the case of the card of Fig. 7, each column of the card is subdivided vertically into three parts to provide an upper, an intermediate and a lower section of four index points each. In any of the four positions, digits may be represented in accordance with the coding shown along the right-hand side of the card of Fig. 7. As noted in this figure, the four positions within each deck have assigned thereto fixed values of 1, 2, 4 and 2 which singly or in combination as punched in a record card represent the values 1 to 9. In the card of Fig. 7 the factors A, B and C will be respectively represented in the decks A, B and C where, for example, the units value of each factor will be represented either singly or in combination in column 80, the tens digit of each factor in column 79, the hundreds digit of each factor in column 78, and the thousands digit of each factor in column 77. The rows of index positions of the card of Fig. 7 are arbitrarily labeled 1, 2, 3, 4 . . . 12 commencing with the top row as shown in Fig. 7.

The circuitry of Fig. 3 will be coupled to the delay line 33 in the manner as shown therein such that the last delayed positive pulse as applied over conductor 38 from terminal 37 (Fig. 1b) will also be applied through the cam controlled contacts CB3 (Fig. 3) to the control grid of the tube 97. It is to be remembered relative to Fig. 3 that the circuitry of Figs. 1a and 1b is coupled also to the delay line 33.

Now before going into a detailed description of the circuit arrangement of Fig. 3, it is to be understood that each time a perforation in any of the three decks of the card of Fig. 7 is sensed, a pulse will be applied to the pertinent order of the counter in the manner as previously described. The circuitry of Fig. 3 is effective in delivering to the counter, in a manner as shall be presently described, the remaining number of pulses representative of the sensed index position at the time the particular index position is being sensed.

Likewise it is obvious that since the various trigger circuits are to be restored to the normal position thereof for each cycle point with the making of the contacts CB15a, the trigger circuits constituting the various stages of the counter will not, in the present case, be controlled by the contacts CB15a, it being noted that an independent reset means for the counter would be used in place of the contacts CB15a. The cam contacts CB15a, which make and break each cycle point as shown in Fig. 8, will cause the remaining trigger circuits, such as $Au$, $Bu$ and $Cu$, for example, to be restored to the normal position thereof, if shifted due to the sensing of a perforation in the associated index position.

When a perforation in index positions 2, 4, 6, 8, 10 or 12 of the record card of Fig. 7, which is representative of a 2 value, is sensed, the circuit arrangement of Fig. 3 will enable an additional pulse to be applied to the pertinent order of the counter in addition to the first pulse normally applied thereto prior to the sensing of the next following cycle point. When a perforation in index positions 3, 7 and 11, which is representative of a 4 value, is sensed, the circuit arrangement of Fig. 3 will enable three additional pulses to be applied to the counter in addition to the first pulse normally applied prior to the sensing of the next following cycle point.

It is pointed out that when the index positions of 1, 5 and 9 of the record card of Fig. 7 are sensed, only a single pulse will be applied to the counter in a normal manner and that the circuit arrangement of Fig. 3 will be ineffective at the time when these positions are being sensed.

Figure 8:
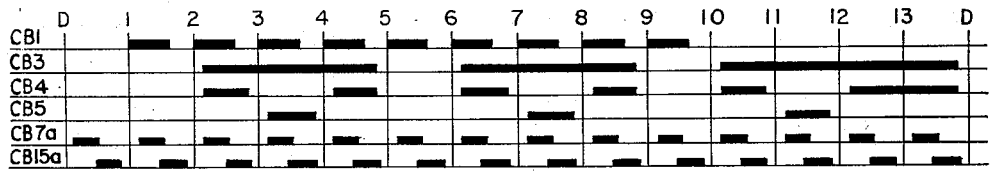
Fig. 8 is a timing diagram showing one complete card cycle when record cards similar to that shown in Fig. 7 are being fed and sensed in a well known manner.

When perforations in index positions 2, 4, 6, 8, 10 and 12 are sensed, and with the cam controlled contacts CB7a closed, such as shown in the timing diagram of Fig. 8, the resulting positive pulse will be applied to the delay line 33. From the delay line 33 this positive pulse will be applied to the counter to register a count of 1 therein in a manner as previously described, and will also be applied from the terminal 37 through the cam controlled contacts CB3 to the control grid of the normally non-conductive tube 97. It is to be noted and realized that there exists a parallel output from the terminal 37 where one output is connected to the tubes TCu, TCt, TCh and TCth, while the other output is coupled to the contacts CB3.

It is to be noted from the timing diagram of Fig. 8 that the cam controlled contacts CB3 make at approximately 2.2, 6.2 and 10.2 index time and respectively break at approximately 4.8, 5, 8.8 and 13.8 index cycle points. The contacts CB3 being closed for all index points other than those representative of 1, namely, index points 1, 5 and 9. It is also to be noted from the timing diagram of Fig. 8 that the cam controlled contacts CB4 make at approximately 2.2, 4.2, 6.2, 8.2, 10.2 and 12.2 index time and break before the next following index point except when it makes at 12 time, at which time it will break at 13.8 index point.

Thus with the cam controlled contacts CB4 in a make position when the index positions 2, 4, 6, 8, 10 and 12 are being sensed, and with the trigger circuit R101 in its normal right tube conducting position, the grid 103 of the tube 97 will be at an increased potential. As a result, with the positive pulse on the control grid of the grid 103, the tube 97 will become conductive upon applying the positive pulse to its other grid 109 from the terminal 37. The tube 97, upon being made conductive, will apply a negative pulse on the control grid of the normally conductive tube 98, rendering this tube non-conductive.

With the tube 98 now being in a non-conductive position, a positive pulse will be applied from its anode over line 104 to the delay line 33 where a second pulse will now be applied to the pertinent order of the counter in a manner as previously described.

At the time that the tube 97 is rendered conductive, a negative pulse will also be applied to the trigger circuit 101 over conductor 107 in order to shift this trigger to its left-hand position causing a decrease in potential of the grid 103 of the tube 97. As a result, the positive pulse applied to the delay line by the tube 98 will be ineffective when it is applied through the delay line terminal 37 to the control grid 109 of the tube 97.

Thus it is obvious that upon sensing any one of the index point positions 2, 4, 6, 8, 10 or 12, each of which is representative of the value 2, a number of pulses numerically equivalent thereof to the coded representation will be applied to the counter.

With the sensing of either a 3, a 7 or an 11 index point, the cam controlled contacts CB5 (Fig. 3) will be closed such as shown in the timing diagram of Fig. 8. As a result, a positive pulse will be applied from the normally non-conductive tube 99 through the delay network 100 and the cam controlled contacts CB5 to the control grid 103 of the tube 97. The application of the positive pulse to the control grid 103 of the tube 97 will increase the potential of this grid.

Now when perforations in index positions 3, 7 and 11 are sensed, and with cam controlled contacts CB7a closed as shown in the timing diagram of Fig. 8, a positive pulse will be applied to the delay line 33. This pulse will be applied from the delay line 33 to the particular order of the counter, in a manner as previously described, to register a count of 1 therein, and from terminal 37 of the delay line 33 through the cam controlled contacts CB3 to the control grid 109 of the normally non-conductive tube 97, causing this tube to be made conductive inasmuch as the grid 103 has an increased potential applied thereto as just described.

It is pointed out that the tube 99 has its control grid 105 coupled to the right-hand side of the trigger circuit 101, while the control grid 106 is similarly coupled to the trigger circuit 102, which connections retain the tube 99 in a non-conductive position. It should be recalled that when the right-hand tube is conducting in the trigger circuit, the grids 105 and 106 of the tube 99 will be retained at a decreased potential.

After the tube 97 is rendered conductive it applies a negative pulse to the tube 98 which is made non-conductive, and as a result applies a positive pulse over the line 104 to the delay line 33. This second positive pulse from the delay line 33 will be applied to the pertinent order of the counter to register a count of 1 (the total count now being 2 for the index position sensed), and through the cam controlled contacts CB3 to the control grid of the tube 97.

At the time that the tube 97 was initially rendered conductive, a negative pulse was also applied over the line 107 to the trigger circuit 101 to cause this trigger to shift such that the left-hand side will now be conductive. As a result of the shifting of the trigger circuit 101, a positive pulse will be applied to the control grid 105 of the tube 99 and to the trigger 102. This positive pulse applied to the terminals f and g of the trigger 102 will be ineffective in shifting the trigger.

The application of this positive pulse to the grid 105 of the tube 99 will be ineffective inasmuch as the grid 106 of this tube is retained at a decreased potential by the trigger circuit 102, which is in the normal right-hand tube conducting position.

This second positive pulse applied from the delay line 33 to the control grid 109 of the tube 97 will render this tube conductive once again inasmuch as the associated grid 103 is still at an increased potential, and upon being rendered conductive, the resulting negative pulse will be applied jointly to the grid of the tube 98 and to the trigger circuit 101. The negative pulse applied to the trigger circuit 101 will cause it to shift back to the right-hand tube conducting, resulting in it applying a negative pulse to the control grid 105 of the tube 99 and to the trigger circuit 102. The application of this negative pulse from the trigger 101 to the trigger 102 will cause this trigger 102 to shift to the left-hand tube conducting. When the trigger circuit 102 shifts to the left, a positive potential will be applied to the control grid 106 of the tube 99. Tube 99 will remain non-conductive inasmuch as the control grid 105 is at a decreased potential.

The tube 98 upon being made non-conductive, will apply a third positive pulse to the delay line 3. This third positive pulse will be applied through the delay line 33 jointly to the pertinent order of the counter to register a count of 1 therein (the total count now being 3), and to the grid 109 of the tube 97. Once again the tube 97 is made conductive since the grid 103 is still at a high potential and applies a negative pulse to the control grid of the tube 98 and to the trigger circuit 101. The pulse applied to the trigger circuit 101 will shift it to the left-hand tube conducting and, as a result, place a positive potential on the grid 105 of the tube 99. Inasmuch as the grid 106 of the tube 99 is at an increased potential due to the fact that the trigger circuit 101 is in a left-hand tube conducting position, the tube 99 will be made conductive. With the rendering of this tube 99 conductive, a negative pulse will be applied to the control grid 103 of the tube 97 causing this tube to be rendered non-conductive.

Now the pulse applied to the control grid of the tube 98 will render this tube non-conductive, causing a fourth positive pulse to be applied over the line 104 to the delay line 33. This fourth positive pulse will be applied jointly from the delay line 33 to the pertinent order of the counter to register the count of 1 therein (the total count now being 4), and to the control grid of the tube 97. This fourth positive pulse from the delay line 33 upon being applied to the control grid of the tube 97 will be ineffective inasmuch as the grid 103 thereof is at a decreased potential.

It is thus now apparent that upon sensing the perforation in either the 3, the 7 or the 11 index point positions of the card of Fig. 7, a number of pulses numerically equivalent to the coded representation of the perforation will be entered into the counter during the time that the card is in that particular index point position. Likewise it is apparent that the circuitry of Fig. 3 meters out the required number of pulses for each of the sensed perforations.

As for perforations appearing in index point positions 1, 5 and 9, the circuitry of Fig. 3 is ineffective inasmuch as the contacts CB3, CB4 and CB5 are in an open condition at these particular times. It is pointed out that on sensing either one of these positions, a single pulse will be applied to the counter in a manner as previously described. It is also pointed out that when operating upon cards such as those shown in Fig. 7, the timing of the cam controlled contacts CB15 has been changed to that shown for cam controlled contacts CB15a in Fig. 8. This arrangement enables each trigger circuit such as Au, At, Ah and Ath, for example, to be reset in the latter half of each index point position prior to the sensing of the next following row.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A machine of the class described for reading in a plurality of denominationally ordered factors and registering the sum thereof within a single card feed cycle comprising, a plurality of denominationally ordered sets of entry receiving means, each order of each of said sets comprising an electronic trigger circuit having an "on" and "off" position and a normally non-conductive electron discharge device, said device having a first and second control grid, said trigger circuit being normally in said "off" position, said trigger circuit being coupled to said second grid, an electronic accumulator having a plurality of orders, means jointly coupling said device of each order of each of said sets to the corresponding order of said accumulator, means for sensing designations respectively representative of said factors, means upon sensing said designations for causing the corresponding one of said trigger circuits to assume said "on" position, said trigger circuit applying a positive pulse to said second grid upon assuming said "on" position, delay line means having a plurality of segments each commonly coupled to said first grid of each device of each said sets, cyclic pulse means coupled to said delay line, said delay line causing said pulse means to apply a succession of positive pulses in progressively delayed increments to each said first grid of each said sets to cause the appropriate one of said devices to become conductive with each pulse applied to said first grid, said devices upon becoming successively conductive causing a count to be entered in the appropriate order of said accumulator such that said accumulator registers the total of said factors.

2. In a cyclically operable machine for registering the total of a plurality of amounts during a single card feed cycle, means for sensing designations respectively representative of a plurality of denominationally ordered amounts, an electronic accumulator having a plurality of orders, entry receiving means including a normally non-conductive tube having a first and second control grid, there being one of said receiving means corresponding to each order of said amounts, means for impressing and retaining a positive potential upon said second grid upon sensing a corresponding designation, delay line means having a plurality of segments correspondingly coupled to said receiving means in which the associated one of said amounts is entered, means coupling said tube of similar orders of each of said receiving means representative of said amounts to the corresponding order of said accumulator, cyclic pulse means applying a positive potential to said first grid such that said tube having said second grid at a positive potential becomes successively conductive, said tube upon becoming conductive applying a pulse to the corresponding order of said accumulator thereby entering a unit count therein, said delay line causing a progressive incremental delay in the application of said cyclic pulse means to said tube of said receiving means representative of said amounts whereby overlapping application of pulses of similar orders of said receiving means is prevented, and means for removing said positive potential from said second grid at the end of said card feed cycle.

3. In a cyclically operable machine of the class described, means for successively sensing index positions in a record card each representative of a coded value, an electronic accumulator having a plurality of orders, means upon sensing said positions for entering a unit count in the appropriate order of said accumulator, and means for entering in said appropriate order a number of pulses equal to the difference of said unit count and sensed coded value, said number of pulses being entered into said accumulator prior to the sensing of the next succeeding one of said positions.

4. In a cyclically operable machine of the class described, means for successively sensing a plurality of index positions in a record card each representative of a digit greater than 1, an electronic accumulator, pulse means effective upon sensing said positions for entering a count of 1 in said accumulator, means for entering in said accumulator a count equal to the difference of said count of 1 and the digit representation of said sensed position, said means being rendered effective after the entering of said count of 1 in said accumulator and prior to the sensing of the next succeeding one of said positions.

5. In a cyclically operable machine of the class described, means for sensing columns of a record card with said columns containing spaced positions, said columns being divided into a plurality of fields wherein denominationally ordered factors are represented by making designations either singly or in combination in said positions, said positions within said fields representative of the digits 4, 2, 2 and 1, an electronic accumulator having a plurality of orders, means upon sensing said designations for entering a count of 1 in the appropriate order of said accumulator, and means for entering the difference between said count of 1 and the numerical equivalent of said sensed designation in the appropriate order of said accumulator prior to the sensing of the next one of said positions.

6. In a cyclically operable machine of the class described, means for successively sensing index positions in a record card each representative of a digit greater than one, an electronic accumulator having a plurality of orders, means upon sensing said positions for entering a unit count in the appropriate order of said accumulator, and means for entering in said appropriate order a number of pulses equal to the difference of said unit count and the digit representative of the sensed position, said number of pulses being entered into said accumulator prior to the sensing of the next succeeding one of said positions.

7. In a cyclically operable machine of the class described, means for successively sensing a plurality of index positions in a record card respectively representative of the digits 4, 2, 2 and 1, an electronic accumulator having a plurality of orders, means upon sensing said positions for applying a single pulse to said accumulator, and means effective upon sensing said positions greater than 1 for applying to said accumulator the difference between said single pulse and said sensed digit representations, said difference of pulses being applied to said accumulator prior to the sensing of the next succeeding index position.

8. In a machine of the class described, means for successively sensing spaced indexed positions of a record card, said card being divided into a plurality of decks, said positions within each said decks in the order sensed being representative of the digits 2, 4, 2 and 1, said decks bearing denominationally ordered factors represented therein by making designations either singly or in combination in said positions, an electronic accumulator having a plurality of orders, means upon sensing said positions representative of the digit 2 for entering a count of 1 in the proper order of said accumulator, additional means for entering an additional count of 1 upon sensing said positions representative of the digit 2, said additional means comprising an electron discharge device having a plurality of grids, trigger circuit means in the normally "off" position, a first cyclic means for causing a first positive pulse to be applied to one of said grids, a second cyclic means for causing a positive pulse to be applied to the other of said grids from said trigger circuit, said device becoming conductive upon receiving said first and second pulses, means responsive to said device being rendered conductive for applying said additional count to said accumulator, said device upon being rendered conductive causing said trigger means to be shifted to an "on" position, said device being restored to a non-conductive condition upon said trigger means assuming said "on" position.

9. In a cyclically operable machine of the class described, means for sensing columns of a record card with said columns containing spaced positions, said positions being sensed successively, said positions respectively representative of the digits 4, 2, 2 and 1, said columns containing a denominationally ordered factor represented therein by making designations either singly or in combination in said positions of each column, an electronic accumulator having a plurality of orders, means upon sensing said positions for entering a count of 1 in the appropriate order of said accumulator, means for entering in the appropriate order of said accumulator a count equal to the difference between said count of 1 and the value of the digit represented by the sensed position, said means for entering the difference in count being rendered effective upon sensing only those positions representative of a digit greater than 1, said difference in count being entered in said accumulator prior to the sensing of the next succeeding position.

10. In a cyclically operable machine of the class described, means for sensing columns of a record card with said columns containing spaced positions, said positions being sensed successively, one of said positions representative of the digit 2, an electronic accumulator having a plurality of orders, means upon sensing said position representative of the 2 digit for entering a count of 1 in the appropriate order of said accumulator, additional means for entering an additional count of 1 in said appropriate order of said accumulator, a first electron discharge device having a plurality of grids, a first trigger circuit means normally in an "off" condition, a first cyclic means for applying a first predetermined potential to one of said grids, a second cyclic means for applying a second predetermined potential from said trigger to the other of said grids, said first device being made conductive upon the application of said first and second potentials thereto, means responsive to said device becoming conductive for applying said additional count of 1 to said accumulator, said conductive device further causing said trigger means to shift to the "on" condition thereof, said trigger means upon assuming said "on" condition causing said conductive device to be made nonconductive, said additional count of 1 being entered in said accumulator prior to the sensing of the next following one of said positions.

11. In a machine of the class described, means for successively sensing spaced positions contained in columns of a record card, said columns being divided into a plurality of decks, said positions within each said decks in the order sensed being representative of the digits 2, 4, 2 and 1, said decks bearing denominationally ordered factors represented therein by making designations either singly or in combination in said positions of each column, an electronic accumulator having a plurality of orders, and means upon sensing said positions for entering in the appropriate order of said accumulator a number of pulses representative of the sensed digit, said pulses being entered in said appropriate order of said accumulator prior to the sensing of the next following position.

12. In a cyclically operable machine of the class described, means for sensing columns of a record card with said columns containing spaced positions representative of predetermined values, said columns being divided into a plurality of fields wherein denominationally ordered factors are represented in said positions, a source of pulses, an electronic accumulator having a plurality of orders, means upon sensing each order of said factors for entering in the appropriate order of said accumulator from said source of pulses a number of pulses equal to the value of the sensed order, delay line means, said delay line means enabling equal values of said sensed orders of said factors to be sequentially entered in the same order of said accumulator.

13. In a cyclically operable machine of the class described, means for sensing columns of a record card with said columns containing spaced positions representative of predetermined values, said columns being divided into a plurality of fields wherein denominationally ordered factors are represented in said positions, a source of pulses, an electronic accumulator having a plurality of orders, means effective upon sensing each order of said factors for entering in the appropriate order of said accumulator from said source of pulses a number of pulses equal to the value of the sensed order, said number of pulses being entered into said accumulator prior to the sensing of the next succeeding one of said spaced positions.

14. In a cyclically operable machine of the class described, means for sensing columns of a record card with said columns containing spaced positions representative of predetermined values, said columns being divided into a plurality of fields wherein denominationally ordered factors are represented in said positions, a source of pulses, an electronic accumulator having a plurality of orders, means upon sensing each order of said factors for entering in the appropriate order of said accumulator from said source of pulses a number of pulses equal to the value of the sensed order, and means for enabling equal values of said sensed orders of said factors to be sequentially entered in the same order of said accumulator.

15. In a cyclically operable machine of the class described, means for sensing a record card, a plurality of denominationally ordered factors entered in said card, an electronic accumulator having a plurality of orders, means upon sensing said amounts for entering in the appropriate order of said accumulator a number of pulses equal to the digit value of the sensed order, and means for enabling equal values of corresponding order of said factors to be sequentially entered in the same order of said accumulator.

16. In a cyclically operable machine of the class described, means for successively sensing index positions in a record card, said card being divided into a plurality of decks, said positions within each said decks being representative of predetermined coded values, said decks bearing denominationally ordered factors represented therein by designations arranged either singly or in combination in said positions, an electronic accumulator having a plurality of orders, a source of pulses, means effective upon sensing said positions in each of said decks for entering in the appropriate order of said accumulator a number of pulses equal to the predetermined coded value of said sensed position, said number of pulses being entered into said accumulator prior to the sensing of a following index position.

References Cited in the file of this patent

UNITED STATES PATENTS

| | | |
|---|---|---|
| 2,528,394 | Sharpless et al. | Oct. 31, 1950 |
| 2,648,835 | Rench | Aug. 11, 1953 |
| 2,738,130 | Dayger et al. | Mar. 13, 1956 |